(12) United States Patent
Vittur et al.

(10) Patent No.: US 10,029,249 B1
(45) Date of Patent: Jul. 24, 2018

(54) SYSTEM AND METHOD FOR ION EXCHANGE REGENERATION (71) Applicant: Baker Hughes, a GE company, LLC, Houston, TX (US)

(72) Inventors: Brandon Vittur, Houston, TX (US); Ronald Matherly, Sugar Land, TX (US); Jiasheng Cao, The Woodlands, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 14/808,787

(22) Filed: Jul. 24, 2015

Related U.S. Application Data (60) Provisional application No. 62/029,064, filed on Jul. 25, 2014.

(51) Int. Cl.
*C02F 1/42* (2006.01)
*B01J 49/00* (2017.01)
*C02F 101/10* (2006.01)

(52) U.S. Cl.
CPC .............. *B01J 49/0078* (2013.01); *C02F 1/42* (2013.01); *C02F 2101/108* (2013.01)

(58) Field of Classification Search
USPC ..................................... 521/26; 210/670, 662
See application file for complete search history.

(56) References Cited

U.S. PATENT DOCUMENTS

| | | | |
|---|---|---|---|
| 3,803,030 A | 4/1974 | Montanaro et al. | |
| 3,862,032 A | 1/1975 | Dixson et al. | |
| 4,279,756 A | 7/1981 | Weiss et al. | |
| 4,770,790 A * | 9/1988 | Oberhofer | B01D 15/00 134/25.1 |
| 5,212,205 A | 5/1993 | O'Brien | |
| 5,352,345 A | 10/1994 | Byszewski et al. | |
| 5,464,530 A | 11/1995 | Stivers | |
| 5,776,340 A | 7/1998 | Jangbarwala et al. | |
| 6,001,262 A | 12/1999 | Kelada | |
| 6,331,261 B1 | 12/2001 | Waatti et al. | |
| 7,811,457 B2 | 10/2010 | Marston | |
| 7,875,186 B2 | 1/2011 | Coppola et al. | |
| 8,177,981 B2 * | 5/2012 | Carson | B01J 49/0004 210/662 |
| 8,585,906 B2 | 11/2013 | Jessen et al. | |
| 2005/0194319 A1 * | 9/2005 | Wegner | B01J 39/04 210/670 |
| 2010/0051556 A1 * | 3/2010 | Grott | C02F 1/42 210/673 |
| 2010/0116663 A1 | 5/2010 | Davis | |
| 2010/0163497 A1 | 7/2010 | Bauder et al. | |
| 2010/0224564 A1 * | 9/2010 | Shafer | B01J 47/14 210/662 |
| 2011/0024358 A1 * | 2/2011 | Pudvay | B01D 9/0018 210/710 |
| 2011/0146145 A1 | 6/2011 | Brandvold et al. | |

* cited by examiner

*Primary Examiner* — Mark Kaucher
*Assistant Examiner* — Henry Hu
(74) *Attorney, Agent, or Firm* — Greenberg Traurig LLP (57) ABSTRACT Systems and methods for ion exchange regeneration for resins onsite at an industrial facility are disclosed. The resins can be boron selective resins and the systems and methods can utilize onsite regeneration, recycling of certain effluent streams, and/or treated water as a main water source for regeneration.

15 Claims, 6 Drawing Sheets

SYSTEM AND METHOD FOR ION EXCHANGE REGENERATION

RELATED APPLICATION

This application claims the benefit, and priority benefit, of U.S. Provisional Patent Application Ser. No. 62/029,064, filed Jul. 25, 2014, the contents and disclosure of which are incorporated by reference herein in their entirety.

BACKGROUND

Field of the Invention

The presently disclosed subject matter relates to ion exchange regeneration, and more particularly, to ion exchange regeneration for boron selective resins onsite at an industrial facility.

Description of the Related Art

Ion exchange resins are used in industrial facilities to remove ions, contaminants, and dissolved solids from fluids. The ion exchange resins can become spent or exhausted after a number of treatment cycles and need to be regenerated to remove the ions that have accumulated in the spent resin. The spent resin can be treated with a resin regeneration solution containing ions that exchange with the accumulated ions in the resin. After regeneration, the ion exchange resin can be rinsed with fresh water and/or other liquids to displace the residual regeneration solution.

Oftentimes, beds of ion exchange resin are removed from the industrial equipment and shipped offsite for regeneration, or the beds of ion exchange resin are treated onsite with fresh water or softened water having undesirable properties. These prior treatment methods can increase the overall regeneration cost. Improvements in this field of technology are desired.

SUMMARY

In an illustrative embodiment, a method of regenerating a boron-selective ion exchange resin is provided. A reactor vessel is provided having the boron-selective ion exchange resin disposed therein. An acid regeneration stream is introduced into the reactor vessel and the acid regeneration stream is reacted with the boron-selective ion exchange resin. The acid regeneration stream is withdrawn from the reactor vessel as an acid regeneration effluent stream. An acid rinse stream is introduced into the reactor vessel. The acid rinse stream is contacted with the boron-selective ion exchange resin. The acid rinse stream is withdrawn from the reactor vessel as an acid rinse effluent stream. A caustic regeneration stream is introduced into the reactor vessel. The caustic regeneration stream is reacted with the boron-selective ion exchange resin. The caustic regeneration stream is withdrawn from the reactor vessel as a caustic regeneration effluent stream. A caustic rinse stream is introduced into the reactor vessel. The caustic rinse stream is contacted with the boron-selective ion exchange resin. The caustic rinse stream is withdrawn from the reactor vessel as a caustic rinse effluent stream. Treated water is utilized in the acid rinse stream and the caustic rinse stream, wherein the treated water has a boron content greater than 0 mg/L and less than or equal to 10 mg/L.

In certain illustrative embodiments, a backwash stream is introduced into the reactor vessel and the backwash stream is contacted with the boron-selective ion exchange resin prior to introducing the acid regeneration stream into the reactor vessel. The boron-selective ion exchange resin is backwashed, and the backwash stream is withdrawn from the reactor vessel as a backwash effluent stream. Treated water can be utilized as the backwash stream, wherein the treated water has a boron content greater than 0 mg/L and less than or equal to 10 mg/L. Fresh water can be added to the caustic regeneration effluent stream to produce a caustic regeneration recycle stream, wherein the fresh water comprises water with a hardness level less than equal to about 250 mg/L hardness as calcium. The caustic regeneration recycle stream is introduced into the reactor vessel. In certain illustrative embodiments, the caustic regeneration recycle stream is introduced into the caustic rinse stream prior to introducing the caustic rinse stream into the reactor vessel. The caustic regeneration effluent stream can be mixed with the fresh water in a mixing vessel.

In certain illustrative embodiments, treated water can be added to the acid rinse effluent stream to produce an acid rinse recycle stream, wherein the treated water has a boron content greater than 0 mg/L and less than or equal to 10 mg/L, and the acid rinse recycle stream can be introduced into the reactor vessel. The introducing of the acid rinse recycle stream into the reactor vessel can comprise introducing the acid rinse recycle stream into the acid rinse stream prior to the acid rinse stream being introduced into the reactor vessel. The adding of treated water to the acid rinse effluent stream can comprise mixing treated water with the acid rinse effluent stream in a mixing vessel. A surfactant rinse stream can be introduced into the reactor vessel and the surfactant rinse stream can be contacted with the boron-selective ion exchange resin subsequent to introducing the caustic rinse stream into the reactor vessel. The surfactant rinse stream can be withdrawn from the reactor vessel as a surfactant rinse effluent stream.

In certain illustrative embodiments, treated water can be added to the surfactant rinse stream prior to introducing the surfactant rinse stream into the reactor vessel at any point in the regeneration process. Also, treated water can be added to the acid regeneration stream prior to introducing the acid regeneration stream into the reactor vessel. The acid regeneration stream that is introduced into the reactor vessel can comprise an HCl solution in the range from about 2-10%. More specifically, the acid regeneration stream introduced into the reactor vessel can comprises an HCl solution of about 5%.

BRIEF DESCRIPTION OF THE DRAWINGS

FIGS. 2-1, 2-2, 2-3 and 2-4 are flow chart segments that collectively show a system and method for ion exchange regeneration in an illustrative embodiment.

While certain preferred illustrative embodiments will be described herein, it will be understood that this description is not intended to limit the subject matter to those embodiments. On the contrary, it is intended to cover all alternatives, modifications, and equivalents as may be included within the spirit and scope of the subject matter as defined by the appended claims.

DETAILED DESCRIPTION

The presently disclosed subject matter relates to systems and methods for ion exchange regeneration for resins onsite at an industrial facility. In certain illustrative embodiments, the resins are boron selective resins and the systems and methods can utilize onsite regeneration, recycling of certain effluent streams, and/or treated water as a main water source for regeneration.

In certain illustrative embodiments, the presently disclosed systems and methods can automatically regenerate the resin beds onsite with treated water once they have reached full or near full capacity in order to reduce transportation and regeneration costs. The systems and methods can include regeneration steps for boron selective ion exchange resins, such as backwash, acid regeneration, acid rinse, caustic regeneration and caustic rinse. One or more additional steps can be included which can involve, for example, adding a surfactant to the backwash water prior to regeneration to remove hydrocarbons from the resin surface. All of the steps can vary in total volumes, flow rates and chemical volumes.

The subject matter is described more fully hereinafter with reference to the accompanying drawings in which illustrative embodiments of the systems and methods are shown. The systems and methods may, however, be embodied in many different forms and should not be construed as limited to the embodiments set forth herein; rather, these embodiments are provided so that this disclosure will be thorough and complete, and will fully convey the scope of the systems and methods to those skilled in the art.

Figure 1:
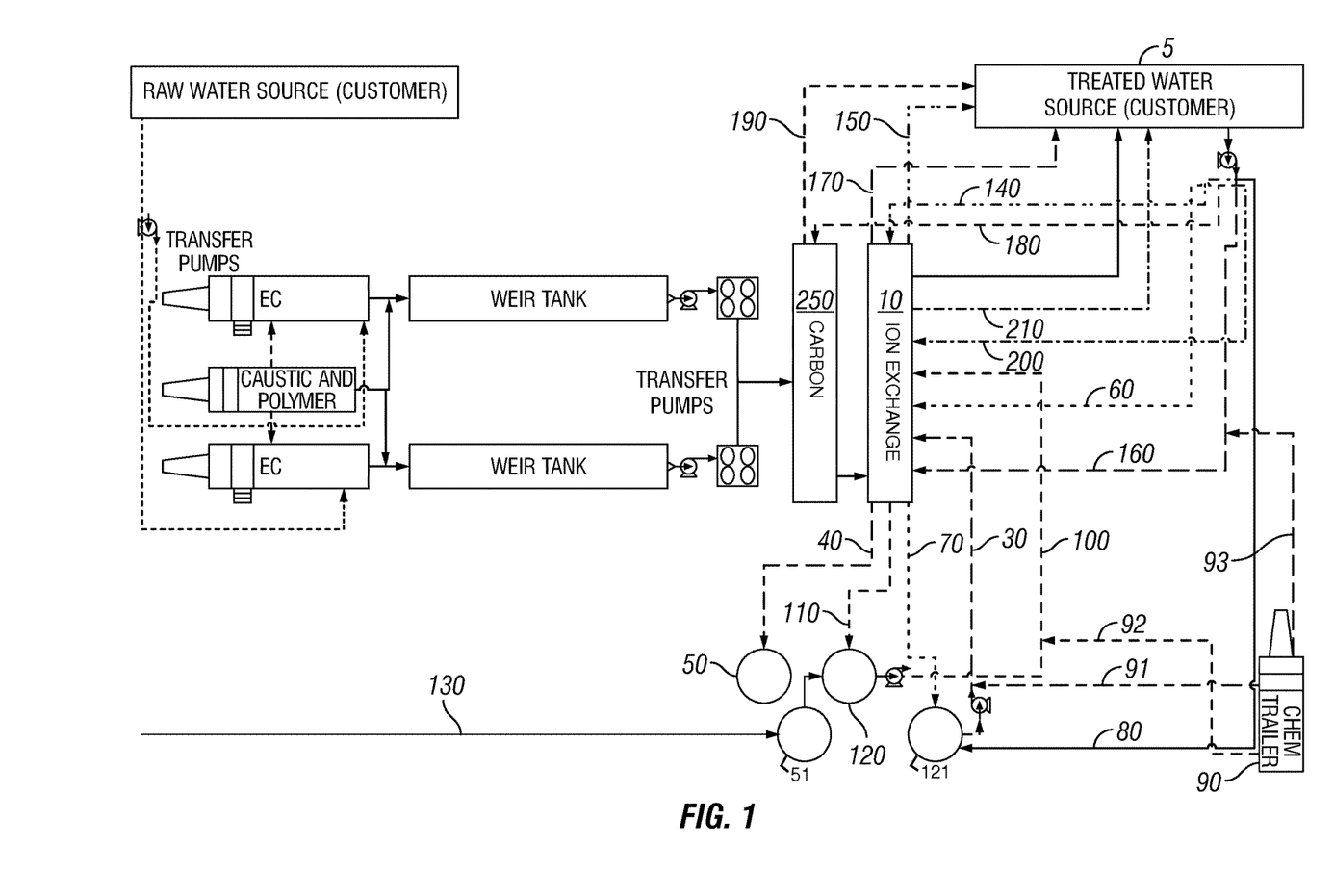
FIG. 1 is a process flow diagram showing a system and method for ion exchange regeneration in an illustrative embodiment.
Figure 3:
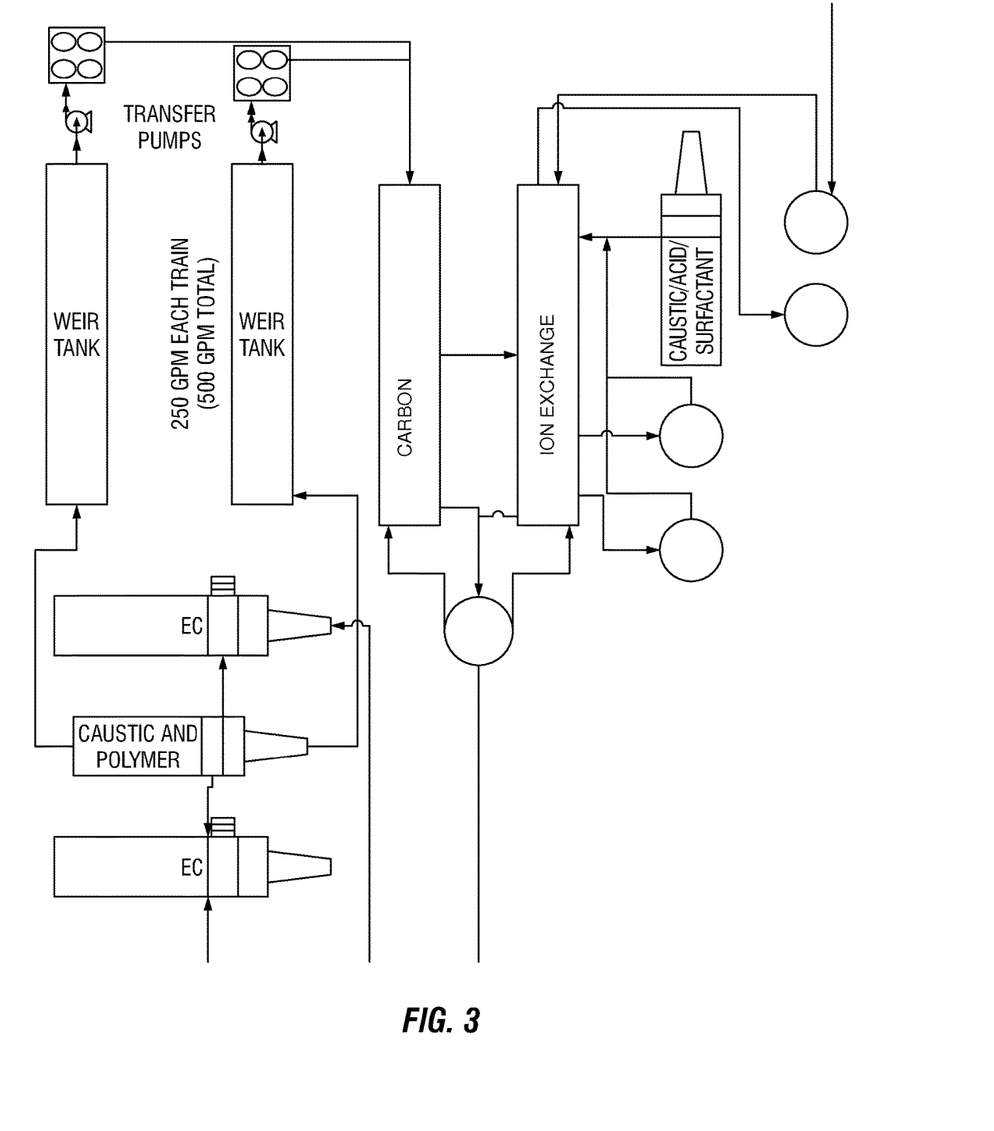
FIG. 3 is a process flow diagram showing water flow in a system and method for ion exchange regeneration in an illustrative embodiment.
Figure 21:
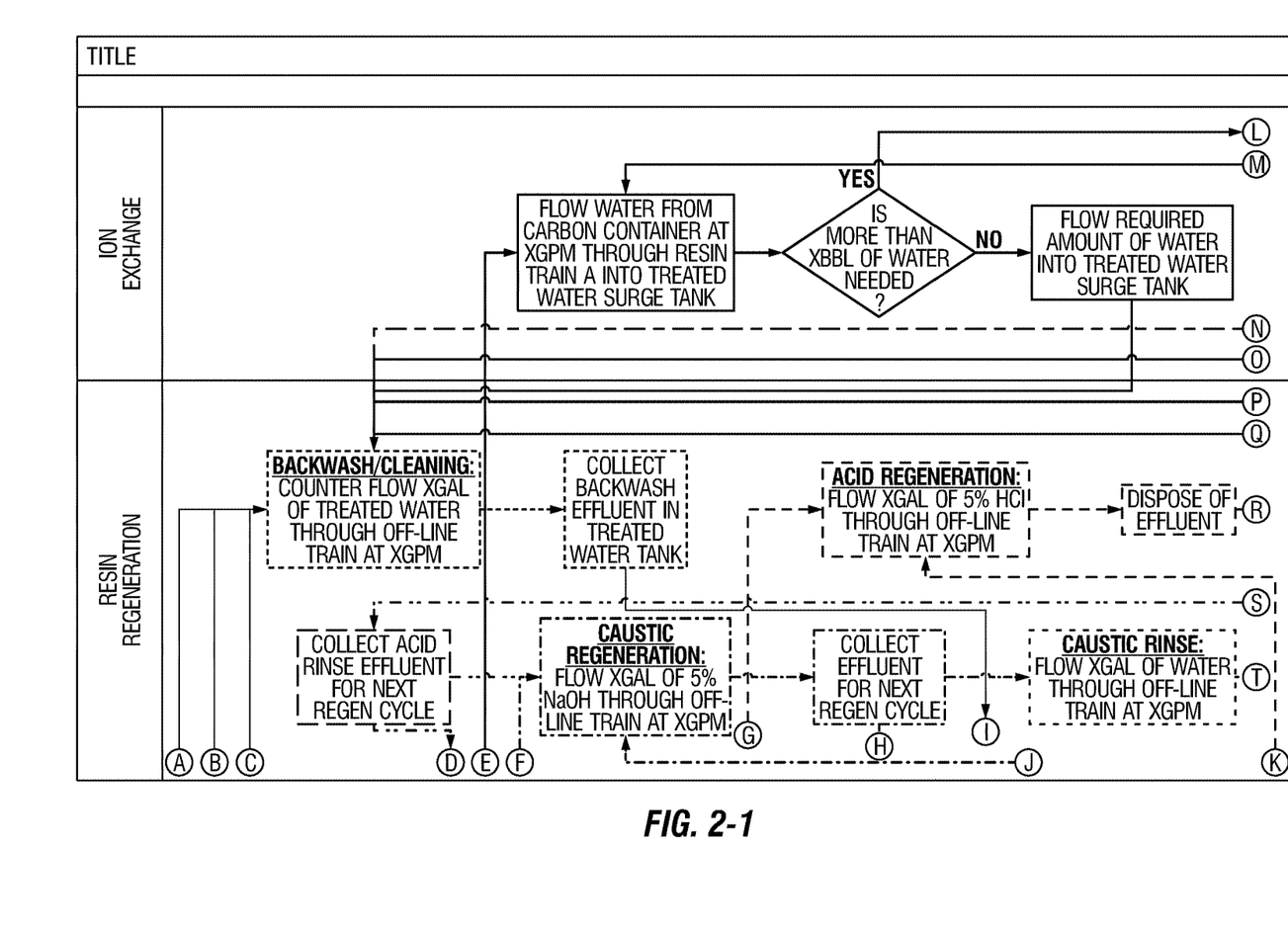
Figure 22:
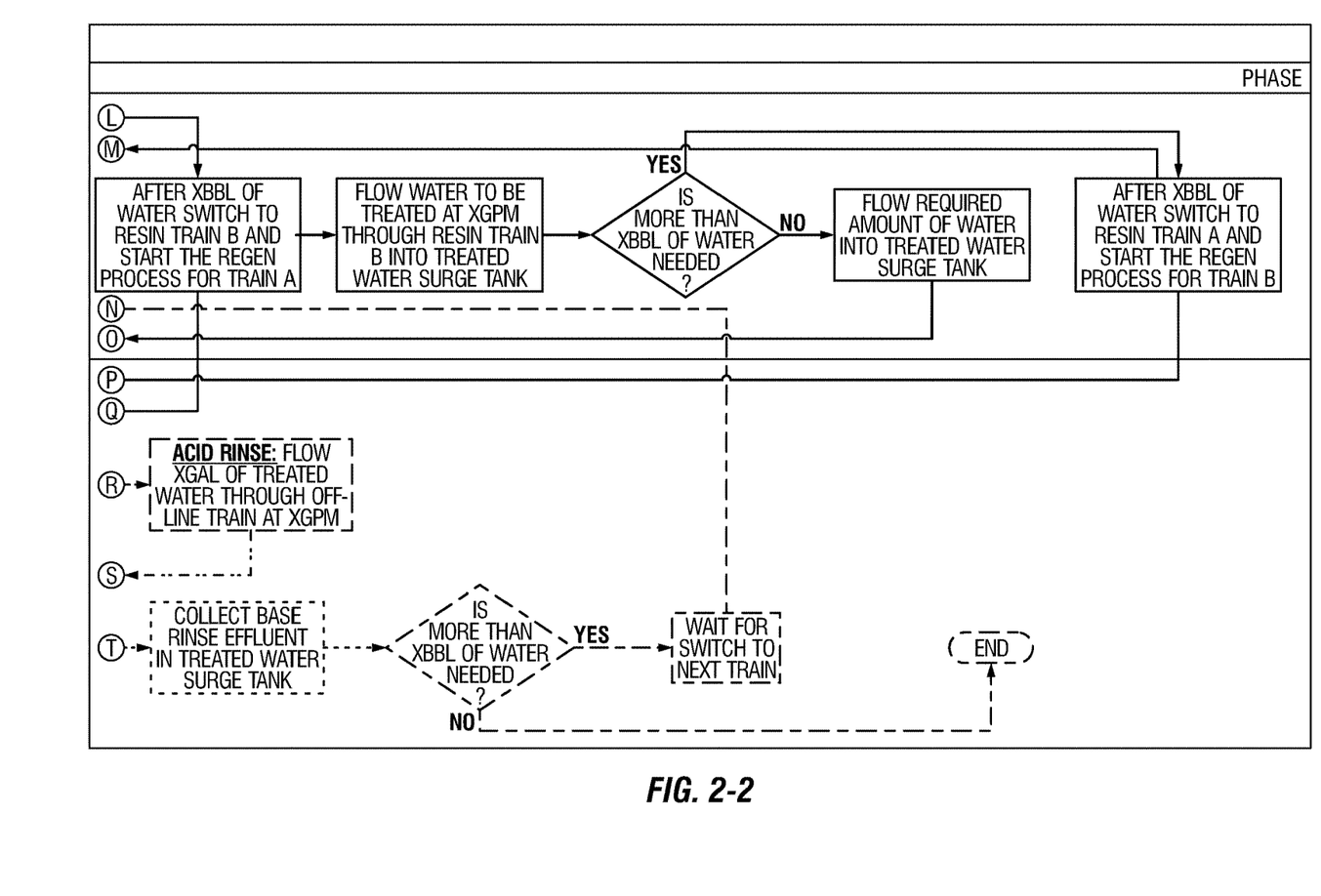
Figure 23:
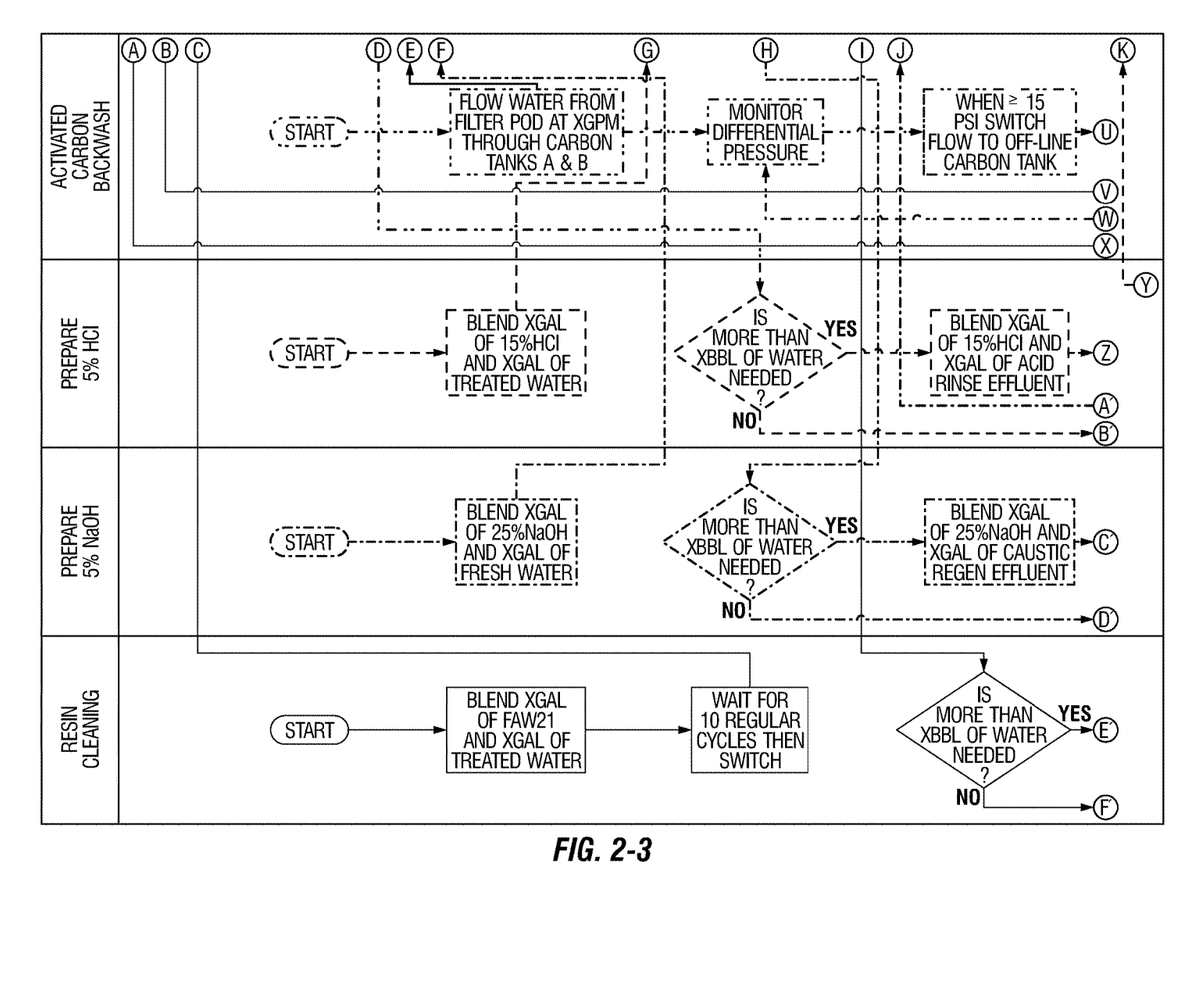
Figure 24:
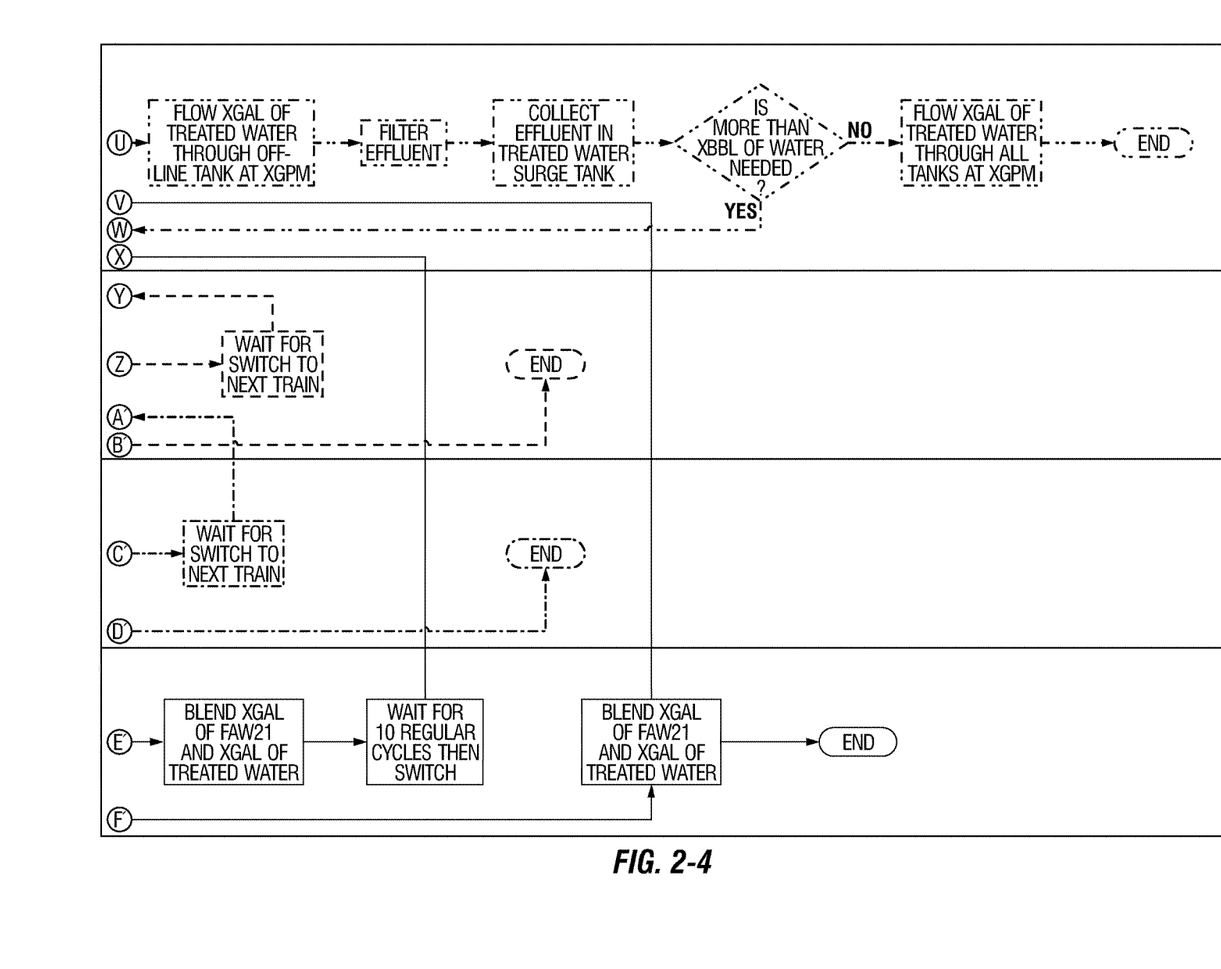

Referring now to FIGS. 1-3, illustrative embodiments of systems and methods for boron-selective ion exchange regeneration are provided. In certain illustrative embodiments, a reactor vessel 10 is provided. Reactor vessel 10 can be of the type used in various different types of processes including, for example, separation, purification, decontamination, water treatment, treatment of toxic liquids or gases, or other applications. Reactor vessel 10 can have ion exchange resin 20 (not shown) disposed therein. Ion exchange resin 20 can be in the form of organic polymer beads, membranes or other structures, and can include cation exchange resins which have functional groups that are strong or weak acid groups and anion exchange resins which have functional groups which are strong or weak base groups. In certain illustrative embodiments, ion exchange resin 20 can be disposed within one or more beds inside of reactor vessel 10. In certain illustrative embodiments, ion exchange resin 20 can be a boron selective resin. As used herein, the term "boron selective resin" shall mean a resin used for removal of boron. For example, the boron selective resin can be a commercially available resin such as polymer beads coupled with amines including but not limited to glucamine.

In certain illustrative embodiments, a treated water source 5 is provided. Treated water source 5 can be, for example, one or more tanks and associated pumps or other means for storing and transporting treated water to and from the ion exchange regeneration. As used herein, the term "treated water" shall mean water which has been through a pretreatment process including but not limited to electrocoagulation, carbon filtration, and/or resin bed treatment or any part thereof. For example, in certain illustrative embodiments, the treated water from treated water source 5 can have a boron content that is greater than 0 mg/L and less than or equal to 10 mg/L. Use of treated water containing up to 10 mg/L boron as the regeneration fluid source for certain regeneration steps as described herein reduces the cost associated with sourcing and transporting fresh or softened water. Further, use of treated water containing up to 10 mg/L boron is acceptable because the goal is not to make potable water. Also, delayed borate cross-linked hydraulic fracturing fluids are stable with water containing up to 10 mg/L which is why the treated water can contain up to 10 mg/L boron in certain illustrative embodiments. In certain illustrative embodiments, the boron content can be greater than 0 mg/L and less than or equal to 30 mg/L if, for example, the customer intends to dilute with fresh water. This scenario can occur if the customer does not have enough produced water for the next hydraulic fracturing job and requires fresh water to supplement its needs. The treated water for use as regeneration fluid should still be less than or equal to 10 mg/L, in certain illustrative embodiments.

In certain illustrative embodiments, an acid regeneration stream 30 can be provided. Acid regeneration stream 30 can be introduced into reactor vessel 10 for regeneration purposes. Acid regeneration stream 30 can comprise, for example, treated water from treated water source 5 with about 1-15% HCl, $HNO_3$, and acetic acid and one or more chemicals from the group consisting of known nonionic surfactants. At least a portion of acid regeneration stream 30 can comprise any of the aforementioned acids provided from a chemical source such as chemical trailer 90 and delivered to acid regeneration stream 30 via a makedown stream 91.

Acid regeneration stream 30 can react with ion exchange resin 20 in reactor vessel 10 to release the boron from the resin. After the reaction is complete or substantially complete, acid regeneration stream 30 can be withdrawn from reactor vessel 10 as an acid regeneration effluent stream 40. Acid regeneration effluent stream 40 can comprise, for example, produced water, high boron acid containing water and surfactants and one or more chemicals from the group consisting of surfactants and produced water. In certain illustrative embodiments, acid regeneration effluent stream 40 is not used as a recycle stream, but instead is directed to disposal in, for example, a disposal tank 50 located onsite or offsite which may be disposed of in a saltwater disposal well. In certain embodiments, disposal tank 50 can be a 300 gallon tank.

In certain illustrative embodiments, an acid rinse stream 60 can be provided. Acid rinse stream 60 can be introduced into reactor vessel 10, typically after introduction of acid regeneration stream 30. Acid rinse stream 60 can comprise, for example, treated water or fresh water. Acid rinse stream 60 can be contacted with ion exchange resin 20 in reactor vessel 10 to remove the acid from the resin bed. After the rinse is complete or substantially complete, acid rinse stream 60 can be withdrawn from the reactor vessel 10 as an acid rinse effluent stream 70. Acid rinse effluent stream 70 can comprise, for example, produced water, fresh water, acid and small amounts of boron. Acid rinse stream 70 can empty into a 2500 gallon acid rinse tank 121 in certain illustrative embodiments.

In certain illustrative embodiments, acid rinse effluent stream 70 can be combined with a treated water stream 80 and then introduced into acid regeneration stream 30. Treated water stream 80 can originate from treated water source 5. Thus, acid rinse effluent stream 70 can comprise contents from acid rinse effluent stream 70, treated water stream 80 and surfactant provided from chemical trailer 90. In certain illustrative embodiments, the acid regeneration stream introduced into the reactor vessel comprises about 2-10% HCl solution. In certain illustrative embodiments, the acid makedown is from 15% to about 2-10%, ideally about 5%.

In certain illustrative embodiments, a caustic regeneration stream 100 can be provided. Caustic regeneration stream 100 can be introduced into reactor vessel 10, typically after acid regeneration stream 30 and acid rinse stream 60. Caustic regeneration stream 100 can comprise, for example, about 25% NaOH solution in fresh water and one or more surfactants. At least a portion of caustic regeneration stream 100 can comprise NaOH and/or KOH provided from a chemical source such as chemical trailer 90 and delivered to caustic regeneration stream 100 via a makedown stream 92.

Caustic regeneration stream 100 can react with ion exchange resin 20 in reactor vessel 10 to convert the active amine acid salt to the active amine basic form. After the reaction is complete or substantially complete, caustic regeneration stream 100 can be withdrawn from reactor vessel 10 as a caustic regeneration effluent stream 100. Caustic regeneration effluent stream 110 can comprise, for example, fresh water, NaOH, KOH and/or one or more chemicals from the group consisting of hydroxides or bases.

In certain illustrative embodiments, caustic regeneration effluent stream 110 can be directed to a storage tank 120 located onsite or offsite. In storage tank 120, caustic rinse effluent stream 110 can be combined with a fresh water stream 130 and then introduced into caustic regeneration stream 100. Alternatively, caustic rinse effluent stream 110 can be combined with a fresh water stream 130 directly without the use of storage tank 120. Fresh water stream 130 can originate from any available water source containing less than or equal to 250 mg/L hardness as calcium. Fresh water steam can also be first stored in a 3000 gallon fresh water tank 51, in certain illustrative embodiments. As used herein, the term "fresh water" shall mean water with hardness less than or equal to 250 mg/L hardness as calcium. Thus, caustic regeneration stream 100 can comprise contents from caustic regeneration effluent stream 110, fresh water stream 130 and NaOH and/or KOH provided from chemical trailer 90. In certain illustrative embodiments, the caustic makedown is from about 25% to about 2.5%.

In certain illustrative embodiments, a caustic rinse stream 140 can be provided. Caustic rinse stream 140 can be introduced into reactor vessel 10 after caustic regeneration stream 100. Caustic rinse stream 140 can comprise, for example, treated water. Caustic rinse stream 140 can be contacted with ion exchange resin 20 in reactor vessel 10 to remove excess caustic and lower pH inside the resin tank. After the caustic rinse is complete or substantially complete, caustic rinse stream 140 can be withdrawn from the reactor vessel 10 as caustic rinse effluent stream 150. Caustic rinse effluent stream 150 can comprise, for example, boron less than or equal to 10 mg/L and higher pH produced water. In certain illustrative embodiments, caustic rinse effluent stream 150 is directed back to treated water source 5 for treatment and reuse.

In certain illustrative embodiments, a surfactant rinse stream 160 can be provided. Surfactant rinse stream 160 can be introduced into reactor vessel 10, in any regeneration step though typically with backwash. Surfactant rinse stream 160 can comprise, for example, a nonionic surfactant and one or more chemicals from the group consisting of water, acid and base. At least a portion of surfactant rinse stream 160 can comprise non-ionic surfactant provided from a chemical source such as chemical trailer 90 and directed to surfactant rinse stream 160 via a makedown stream 93. In certain illustrative embodiments, the surfactant makedown is from 100% to about 0.1%.

Surfactant rinse stream 160 can interact with ion exchange resin 20 in reactor vessel 10 to remove hydrocarbons and other contaminants from any water source such as produced water from the resin surface. Surfactant rinse stream 160 can comprise, for example, treated water. After the interaction is complete or substantially complete, surfactant rinse stream 160 can be withdrawn from reactor vessel 10 as a surfactant rinse effluent stream 170. Surfactant rinse effluent stream 170 can comprise, for example, treated water, fresh water and one or more chemicals from the group consisting of any non-ionic surfactant for example nonyl phenol with nine moles of ethylene oxide. In certain illustrative embodiments, surfactant rinse effluent stream 170 is directed back to treated water source 5 for treatment and reuse.

In certain illustrative embodiments, one or more carbon backwash units 250 can be utilized in connection with reactor vessel 10. Carbon backwash unit 250 can comprise, for example, granular activated carbon and other types of carbon from multiple sources. A carbon backwash stream 180 can be provided. Carbon backwash stream 180 can be introduced into carbon backwash unit 250. Carbon backwash stream 180 can comprise, for example, treated water. Carbon backwash stream 180 can be utilized to remove organic material from carbon backwash unit 250. Carbon backwash stream 180 can be withdrawn from carbon backwash unit 250 as a carbon backwash effluent stream 190. In certain illustrative embodiments, carbon backwash effluent stream 190 is directed back to treated water source 5 for treatment and reuse. In certain embodiments, carbon backwash effluent stream 190 can also be directed to disposal or back to the well treating equipment for separation of the oil for sale.

In certain illustrative embodiments, a backwash stream 200 can be provided. Backwash stream 200 can comprise, for example, treated water. Backwash stream 200 can be introduced into reactor vessel 10 prior to introducing acid regeneration stream 30. Backwash stream 200 can be contacted with ion exchange resin 20 to backwash ion exchange resin 20 and fluff up the resin for regeneration. For example, the flow can travel from bottom up to remove solids and increase surface area of beds during regeneration, in certain embodiments. Backwash stream 200 can be withdrawn from reactor vessel 10 as a backwash effluent stream 210. In certain illustrative embodiments, backwash effluent stream 210 is directed back to treated water source 5 for treatment and reuse. Backwash effluent stream 210 can also be directed to disposal.

In the illustrative embodiments provided herein, the disclosed systems and methods advantageous provide the ability to reuse or recycle all of the effluent streams during the regeneration process. In certain illustrative embodiments, all of the effluent streams except the acid regeneration effluent stream and, potentially, a portion of the acid rinse stream, can be reused or recycled. For example, at least a portion of the acid rinse stream can be directed to treated water source 5 for reuse. Reuse or recycling of these effluent streams reduces the amount of waste generated which decreases the overall disposal cost, as well as reduces the amount of fresh water or softened water that must be used for regeneration. Further, contaminants in the reused or recycled effluent streams do not affect the performance of hydraulic fracturing fluids.

In the illustrative embodiments provided herein, the systems and methods can advantageously use treated water as the water source for all regeneration steps. In certain illustrative embodiments, treated water can be as the water source for all regeneration steps except the caustic regeneration step. If the regeneration water is low enough in hardness (less than about 250 mg/L) regeneration water can also be used. Each step can be optimized with respect to time and volume of water and chemicals required. The caustic regeneration water source can be determined based on the hardness level of the treated water and available fresh water, among other factors. For example, treated water can be used for the caustic regeneration step when the treated water has a hardness level of less than about 250 mg/L as calcium.

In certain illustrative embodiments provided herein, the backwash and the rinse water are not reused except for the acid rinse. Instead, these effluent streams are routed back to the treated water source, which can be, for example, a surge tank which continuously flows to a large treated water pit or other type of containment means. Treated water can pulled from the treated water source for the next regeneration cycle. By that time, the water in the surge tank is preferably all treated water.

In certain illustrative embodiments, the volume of caustic required by monitoring pH of the effluent after caustic regeneration can be reduced. Typical procedures require a specific amount of NaOH to pass over the resin. For example, a closed loop process has been utilized where NaOH is added slowly to the loop and the pH of the effluent is monitored until a specific pH range is reached. In certain illustrative embodiments as provided herein, pH can be monitored after each cycle and adjusted on the subsequent cycle until the pH of the effluent falls within a specified range. This will reduce the amount of caustic used, saving time and eliminating the caustic rinse step or significantly reducing the amount of caustic rinse needed.

In certain illustrative embodiments, the total time required to regenerate the resin can be reduced. Typical procedures require a minimum of 2-2.5 hours or more. The presently disclosed illustrative embodiments can reduce this time to approximately 45 minutes or less. This allows a user to treat water containing a higher concentration of boron without additional resin or downtime.

In certain illustrative embodiments, unsoftened treated water can be used for the caustic regeneration step. This will remove the requirement for sourcing fresh or softened water. As used herein, the term "softened water" shall mean water that is less than 250 mg/L hardness as calcium. Also, biodispersant and biocide are not utilized in the resin cleaning steps, in certain illustrative embodiments.

In certain illustrative embodiments, the ion exchange regeneration process described herein can be used after boron removal treatment has occurred. For example, certain methods and apparatus for removing boron from water and more particularly, methods and apparatus for removing boron from untreated water, such as, but not limited to, oilfield produced water and flowback water, are described in U.S. Patent Application Publication No. 2014/0339162, published Nov. 20, 2014, and assigned to Baker Hughes Incorporated, the contents and disclosure of which are incorporated by reference herein in their entirety In an illustrative embodiment, as set forth in Table 1 below, the following process steps for the presently disclosed process correspond to the identified reference numbers from FIG. 1:

TABLE 1

| Step | Description | Ref. # from FIG. 1 |
|---|---|---|
| 1.1 | Backwash | 200 |
| 1.2 | Backwash Effluent | 210 |
| 2.1 | Acid Makedown 15% → 5% | 91 |
| 2.2 | Acid Regen Recycled H$_2$O | 30 |
| 2.3 | Acid Regen - Effluent | 40 |
| 3.1 | Acid Rinse | 60 |
| 3.2 | Acid Rinse Effluent | 70 |
| 4.1 | Caustic Makedown 25% → 5% | 92 |
| 4.2 | Caustic Regen Recycled H$_2$O | 100 |
| 5.1 | Caustic Rinse | 140 |
| 5.2 | Caustic Rinse | 150 |
| 6.1 | Surfactant Makedown 100% → 0.1% | 93 |
| 6.2 | Surfactant Rinse | 160 |
| 7.1 | Carbon Backwash | 180 |
| 7.2 | Carbon Backwash Effluent | 190 |

While the foregoing disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter. Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the appended claims.

What is claimed is:

1. A method of regenerating a boron-selective ion exchange resin, the method comprising:
   introducing an acid regeneration stream into a reactor vessel having the boron-selective ion exchange resin disposed therein and reacting the acid regeneration stream with the boron-selective ion exchange resin, wherein the acid regeneration stream comprises one or more of HCl, HNO$_3$ and acetic acid;
   withdrawing the acid regeneration stream from the reactor vessel as an acid regeneration effluent stream, wherein the acid regeneration effluent stream comprises boron released from the ion exchange resin;
   introducing an acid rinse stream into the reactor vessel and contacting the acid rinse stream with the boron-selective ion exchange resin, wherein the acid regeneration stream comprises treated water;
   withdrawing the acid rinse stream from the reactor vessel as an acid rinse effluent stream;
   introducing a caustic regeneration stream into the reactor vessel and reacting the caustic regeneration stream with the boron-selective ion exchange resin, wherein the caustic regeneration stream comprises one or more of NaOH and KOH;
   withdrawing the caustic regeneration stream from the reactor vessel as a caustic regeneration effluent stream;
   introducing a caustic rinse stream into the reactor vessel and contacting the caustic rinse stream with the boron-selective ion exchange resin, wherein the caustic regeneration stream comprises treated water;
   withdrawing the caustic rinse stream from the reactor vessel as a caustic rinse effluent stream;
   introducing a surfactant rinse stream into the reactor vessel and contacting the surfactant rinse stream with the boron-selective ion exchange resin, wherein treated water is added to the surfactant rinse stream prior to introducing the surfactant rinse stream into the reactor vessel at any point in the regeneration process; and withdrawing the surfactant rinse stream from the reactor vessel as a surfactant rinse effluent stream;

wherein the treated water is obtained by subjecting one or more of oilfield produced water and flowback water to a pretreatment comprising one or more of electrocoagulation, carbon filtration and resin bed treatment before being added to the acid rinse stream, the surfactant rinse stream or the caustic rinse stream, such that after the pretreatment, the treated water has a boron content greater than 0 mg/L and less than or equal to 10 mg/L.

2. The method of claim 1, further comprising:

prior to introducing the acid regeneration stream into the reactor vessel, introducing a backwash stream into the reactor vessel and contacting the backwash stream with the boron-selective ion exchange resin;

backwashing the boron-selective ion exchange resin; and withdrawing the backwash stream from the reactor vessel as a backwash effluent stream.

3. The method of claim 2, wherein treated water is utilized as the backwash stream, and wherein the treated water has a boron content greater than 0 mg/L and less than or equal to 10 mg/L.

4. The method of claim 3, wherein the treated water has a boron content greater than 1 mg/L and less than or equal to 10 mg/L.

5. The method of claim 3, wherein the treated water has a boron content greater than or equal to 5 mg/L and less than or equal to 10 mg/L.

6. The method of claim 1, further comprising adding treated water to the acid rinse effluent stream to produce an acid rinse recycle stream, wherein the treated water has a boron content greater than 0 mg/L and less than or equal to 10 mg/L; and introducing the acid rinse recycle stream into the reactor vessel.

7. The method of claim 6, wherein the introducing of the acid rinse recycle stream into the reactor vessel comprises introducing the acid rinse recycle stream into the acid rinse stream prior to the acid rinse stream being introduced into the reactor vessel.

8. The method of claim 6, wherein the adding of treated water to the acid rinse effluent stream comprises mixing treated water with the acid rinse effluent stream in a mixing vessel.

9. The method of claim 6, wherein the treated water has a boron content greater than 1 mg/L and less than or equal to 10 mg/L.

10. The method of claim 6, wherein the treated water has a boron content greater than or equal to 5 mg/L and less than or equal to 10 mg/L.

11. The method of claim 1, further comprising adding the treated water to the acid regeneration stream prior to introducing the acid regeneration stream into the reactor vessel.

12. The method of claim 1, wherein the acid regeneration stream introduced into the reactor vessel comprises an HCl solution in the range from 2-10%.

13. The method of claim 12, wherein the acid regeneration stream introduced into the reactor vessel comprises an HCl solution of about 5%.

14. The method of claim 1, wherein the treated water has a boron content greater than 1 mg/L and less than or equal to 10 mg/L.

15. The method of claim 1, wherein the treated water has a boron content greater than or equal to 5 mg/L and less than or equal to 10 mg/L.

* * * * *